C. W. SCHINDLER, dec'd. & E. J. GERDOM, Lunatic,

W. SCHINDLER, Ex'r. of C. W. SCHINDLER, dec'd., and H. L. WASHBURN, Jr., Committee of the person and estate of E. J. GERDOM, Lunatic, Assignors by mesne assignments to A. COOK & P. PULVER.

LUBRICATOR.

No. 7,508. Reissued Feb. 13, 1877.

Fig. 1.

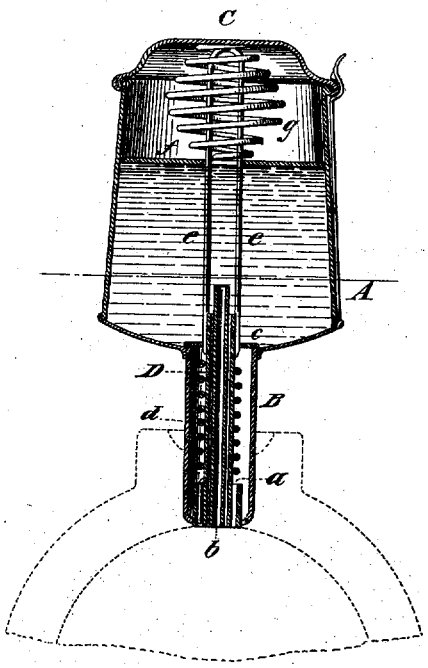

Fig. 2.

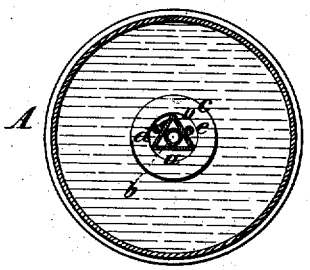

Inventor's
C. W. Schindler Dec'd
E. J. Gerdom Lunatic
A. Cook and P. Pulver Assignees WITNESSES:
Gustave Dietrich
J. H. Scarborough W. Schindler Ex'r
H. L. Washburn Jr.
BY Committee.
Munn & Co
ATTORNEYS.

N. PETERS, PHOTO-LITHOGRAPHER, WASHINGTON, D. C.

UNITED STATES PATENT OFFICE.

WILLIAM SCHINDLER, (EXECUTOR OF C. W. SCHINDLER, DECEASED,) AND H. L. WASHBURN, JR., (COMMITTEE OF THE PERSON AND ESTATE OF E. J. GERDOM, LUNATIC,) OF ALBANY, N. Y., ASSIGNORS, BY MESNE ASSIGNMENTS, TO ADAM COOK AND PETER PULVER, OF NEW YORK CITY.

IMPROVEMENT IN LUBRICATORS.

Specification forming part of Letters Patent No. 77,974, dated May 19, 1868; reissue No. 7,508, dated February 13, 1877; application filed December 16, 1876.

*To all whom it may concern:*

Be it known that EMERICH J. GERDOM and CHARLES W. SCHINDLER, of Albany, in the county of Albany and State of New York, invented a new and Improved Grease-Cup, of which the following is a specification:

Figure 1 represents a vertical central section of this invention. Fig. 2 is a horizontal section of the same.

Similar letters of reference indicate corresponding parts.

This invention relates to a grease-cup which is provided at its bottom with a tubular conductor.

From the inner end of the tubular conductor extends a stop, which serves the double purpose of conducting the heat through the grease, and of a gage to bring the grease-cup in the proper position in relation to the shaft to be lubricated.

A represents a grease cup, which is made of sheet metal, or any other suitable material, and provided with a tubular leg, B, and with a lid, C, which is attached to the body of the cup by a hinge-joint, and secured by a spring-catch, or which may be attached by a screw-thread, or in any other suitable manner.

The bottom end of the leg B is scalloped, so that the same is not liable to clog up if it should come in contact with the shaft to be lubricated.

Through the interior of the leg B extends the tubular conductor D, which is composed of a copper element, *a*, and a zinc element, *b*, made in the form of tubes, as shown, or in any other suitable form or shape. Said elements are secured in a disk, *c*, and they are surrounded by a spiral conductor, *d*. Their lower ends are flush with each other, so that if the grease-cup is placed in position on the shaft to be lubricated, the ends of both elements will be in contact with the surface of said shaft. From the disk *c* rises a stop, *e*, which extends up close to the inner surface of the lid, and which serves to adjust the cup in the proper position, so that the tubular conductor will bear upon the periphery of the shaft to be lubricated without permitting the leg B to come in contact with said shaft. If the cup is depressed too far, so that the leg will bear against the shaft, the stop *e* prevents the lid being closed, and by the very act of closing the lid down the cup is raised up to the proper position.

The cup is filled with grease the melting-point of which is at a temperature of from 100° to 110°, so that it will remain solid at the ordinary temperature, and begin to melt whenever it is heated beyond its melting-point. On the top of the grease is placed a disk, *f*, which is subjected to the action of a spring, *g*, so that the same is continually depressed on the grease, and the grease is held down to the bottom of the cup. When the shaft revolves and remains at its ordinary temperature, the grease in the cup remains solid; but as soon as the shaft begins to heat, a small quantity of the grease is melted and allowed to pass down through the tubular conductor D. By these means a sufficient supply of grease is conducted to the shaft whenever the shaft requires it; but when the shaft does not require to be lubricated the grease sets, and all waste of lubricating material is avoided.

Having thus described this invention, we claim as new and desire to secure by Letters Patent—

1. The combination, with a grease-cup having tubular leg B, of a conductor resting upon the shaft, and having an extension, *e*, that makes it a little longer than the height of cup, as shown and described, so that when the lid is fastened down the cup will be sustained a little above the lower end of conductor and of the shaft to be lubricated.

2. In a lubricating-cup for shafts, the disk or follower *f*, arranged to rest on the grease in cup, and held by a spring, *g*, arranged substantially as and for the purpose specified.

WM. SCHINDLER,
*Executor of the Estate of C. W. Schindler.*

H. L. WASHBURN, JR.,
*Committee, &c., of Emerich J. Gerdom.*

Witnesses:
EDWARD W. RANKIN,
SAML. COHN.